United States Patent
Hancock

[11] 3,861,241
[45] Jan. 21, 1975

[54] TRANSMISSION WITH SPEED RESPONSIVE SHIFTING IN REVERSE GEARS

[75] Inventor: Daniel M. Hancock, Southport, Ind.

[73] Assignee: General Motors Corporation, Detroit, Mich.

[22] Filed: Jan. 17, 1974

[21] Appl. No.: 434,229

[52] U.S. Cl. .................. 74/733, 74/732, 74/752 C, 74/753, 74/763
[51] Int. Cl. ........................................... F16h 47/08
[58] Field of Search .......... 74/731, 732, 733, 752 C, 74/753, 763

[56] References Cited
UNITED STATES PATENTS
| | | | |
|---|---|---|---|
| 3,053,116 | 9/1962 | Christenson et al. | 74/732 X |
| 3,800,629 | 4/1974 | Lentz | 74/731 X |

Primary Examiner—Samuel Scott
Assistant Examiner—John Reep
Attorney, Agent, or Firm—A. M. Heiter

[57] ABSTRACT

A transmission providing a torque converter or lockup clutch drive in series with four forward gear ratio drives on engagement of a forward clutch and the selective engagement of the first through fourth ratio drive devices and two reverse ratio drives on the engagement of the fourth ratio device and the selective engagement of the first and second ratio devices. The controls have a manual selector valve operative in a forward position to permit operation of the lockup shift valve to engage the lockup clutch at a higher speed, to engage the forward clutch and permit operation of the first second, second third and third fourth speed and torque demand controlled shift valves for automatic first through fourth gear ratio forward drive shifting and to prevent operation of a reverse one two shift valve. The manual selector valve in reverse position prevents operation of the lockup shift valve for torque converter drive without lockup clutch engagement, holds the third fourth shift valve in third position so reverse pressure engages the fourth device, holds the first second shift valve in first to supply the reverse one two shift valve, activates the reverse one two shift valve to normally engage the first drive device for reverse one drive and permits an upshift by governor pressure at a higher speed to engage the second drive device for reverse two drive. A manual signal valve supplies main line pressure to the governor signal line to provide, with the selector valve in a forward position, lockup and fourth ratio drive for a push start and with the selector valve in reverse position the second reverse drive.

9 Claims, 6 Drawing Figures

TRANSMISSION WITH SPEED RESPONSIVE SHIFTING IN REVERSE GEARS

BACKGROUND OF INVENTION

This invention was made in the course of work under contract or subcontract thereunder with the Department of Defense and relates to transmissions and particularly transmission controls.

Transmissions having a torque converter or lockup clutch drive in series with a three gear set gear unit operative on engagement of the forward clutch and the selective engagement of the first through fourth ratio drive devices to respectively provide first through fourth forward ratio drives and operative on the engagement of the fourth ratio drive device and the selective engagement of the first and second ratio drive devices to respectively provide first and second reverse drives are known as in O'Malley U.S. Pat. No. 3,730,022 patented May 1, 1973. Controls having a manual selector valve operative in all positions to permit operation of a lockup shift valve to engage the lockup clutch at a higher speed, in a forward position to engage the forward clutch and permit operation of the first second, second third and third fourth speed and torque demand controlled automatic shift valves for automatic first through fourth gear ratio forward drive shifting and in reverse position to engage the first and fourth ratio device for a reverse drive as shown in Schaefer et al. U.S. Pat. No. 3,691,872 patented Sept. 19, 1972.

SUMMARY OF THE INVENTION

This invention provides a transmission having an improved control providing speed responsive forward and reverse drive shifting. Further, the speed responsive shifting controls have improved manual overcontrols providing a lockup clutch drive in a high ratio for push start operation at any speed. The speed responsive controls also have improved manual reverse shift overcontrols providing a torque converter drive. The same overcontrol system controls the speed responsive shift system for both push start and manual reverse shift operation.

The transmission drive train has a torque converter and lockup clutch drive in series with a gear unit providing four forward ratio drives and two reverse ratio drives. The gear unit provides on engagement of a forward clutch and the selective engagement of the first through fourth ratio drive devices first through fourth ratio drives. The gear unit also provides the two reverse ratio drives, first reverse and second reverse on the engagement of the fourth ratio device and respectively on the selective engagement of the first and second ratio devices. The controls have a manual selector valve operative in a forward automatic position to permit operation of the lockup shift valve to engage the lockup clutch at a higher speed, to engage the forward clutch and permit operation of the first second, second third and third fourth speed and torque demand controlled shift valves for automatic first through fourth gear ratio forward drive shifting and to prevent operation of a reverse one two shift valve to maintain forward drive connections therethrough for establishment of the first and second ratio devices. The manual selector valve in reverse position, an automatic reverse position, prevents operation of the lockup shift valve for full time torque converter drive at all speeds without lockup clutch engagement, holds the third fourth shift valve in third position so reverse pressure engages the fourth device, holds the first second shift valve in first to supply the reverse one two shift valve, activates the reverse one two shift valve to normally engage the first drive device for first reverse drive and permits an upshift of the reverse one two shift valve by governor pressure at a higher speed to engage the second drive device for second reverse drive. A manual signal valve is opened to supply main line pressure to the governor signal line to provide, with the selector valve in a forward automatic position, lockup shift valve upshift for lockup drive and upshift of all automatic shift valves for fourth ratio drive for a push start. The same manual signal valve, when opened to supply main line pressure to the governor signal line, with the selector valve in the automatic reverse position, manually provides the second reverse drive and reverse pressure insures full time torque converter drive as the reverse pressure prevents a lockup shift valve upshift and holds the automatic shift valves in the reverse drive position.

These and other features and advantages of the present invention will be more apparent from the following description and drawings of the preferred embodiment in which:

Figure 1:
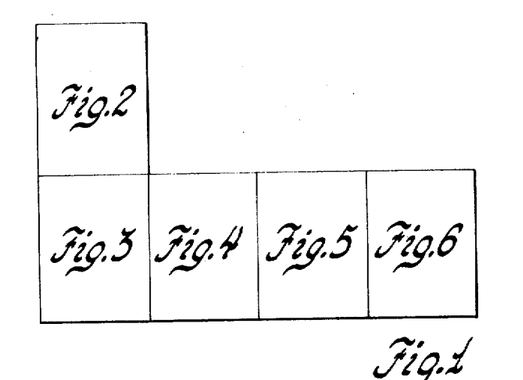
FIG. 1 is a block diagram showing the arrangement of FIGS. 2, 3, 4, 5 and 6.
Figure 2:
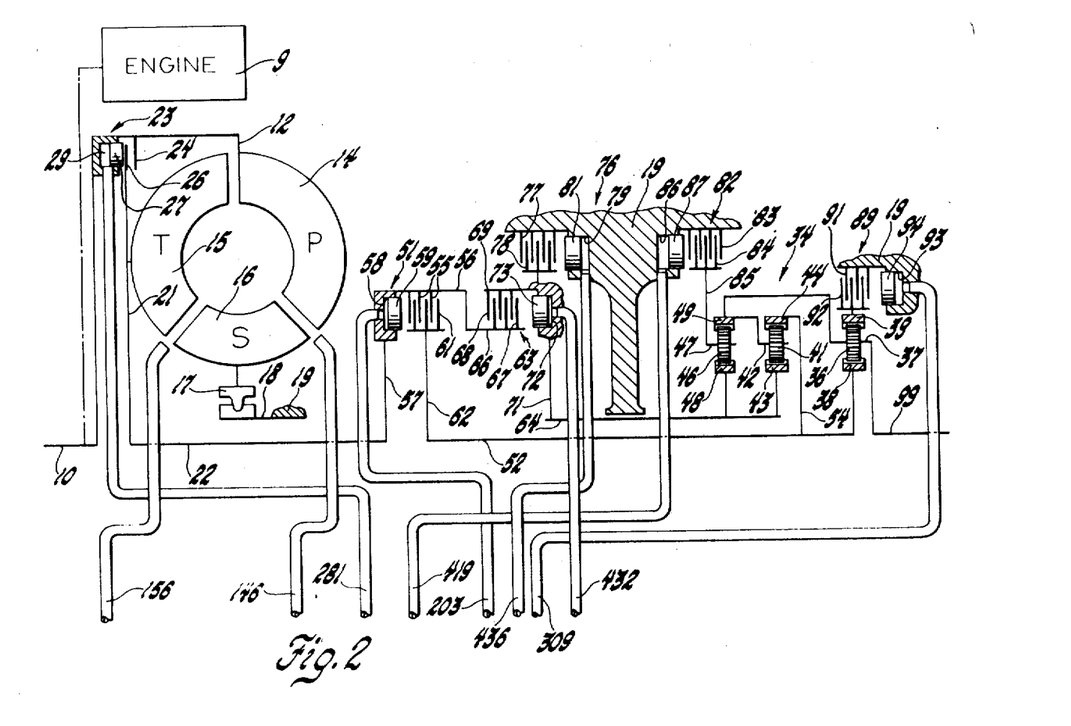
FIGS. 2, 3, 4, 5 and 6 when arranged according to FIG. 1 schematically show the gearing and control of the transmission.

Referring to the drawing, FIG. 2 shows an engine 9 driving the power train having an input shaft 10 driving a rotary hydraulic torque converter housing 12 which drives the pump 14. The pump hydrokinetically drives the turbine 15 and the fluid is redirected by the stator 16 to the pump 14. The stator is mounted on a one-way brake 17 secured to a sleeve 18 fixed to the housing 19. The turbine is connected by a hub 21 to the torque converter output shaft 22. A lockup clutch 23 for directly connecting the input shaft 10 to the converter output shaft 22 has a fixed backing plate 24 mounted on the rotary housing 12, a driven plate 26 connected through hub 21 to drive the output shaft 22 and a diaphragm piston and apply plate 27 which forms a closed expansible chamber 29 between the diaphragm piston 27 and the front wall of the rotary housing 12.

The four speed gear unit generally designated 34 has three planetary gear sets to provide four forward speeds and two reverse speeds which are hereinafter referred to as first to fourth and reverse one and two. The first gear set of the four speed unit 34 has planetary pinions 36 mounted on a carrier 37 and meshing with sun gear 38 and ring gear 39. The second gear set has pinions 41 rotatably mounted on carrier 42 and meshing with sun gear 43 and ring gear 44. The third gear set has planetary pinions 46 mounted on the carrier 47 and meshing with sun gear 48 and ring gear 49.

A forward clutch 51 is engaged in all forward ratios and connects the torque converter output shaft 22 to primary input shaft 52 to drive the sun gear 38 of the first gear set and through hub 54 the ring gear 44 of the second gear set. The forward clutch 51 has plates 55 mounted on a drum 56 driven by the rotary hub 57 drive connected to shaft 22. The hub 57 has a cylinder 58 formed therein for piston 59. On the supply of fluid by the drive four line 203 to the cylinder 58, the piston 59 engages the plates 55 and the plates 61 which are connected by a hub 62 to the primary input shaft 52. Fourth speed clutch 63 connects the shaft 22 to the secondary input shaft 64 which drives the sun gears 43 and 48 of the second and third gear sets and cooperates with clutch 51 to lock all transmission units for 1:1 drive to the output 99. The fourth speed clutch 63 has an input drum 66 formed as a continuation of drum 56 to drive input plates 67. The output plates 68 are connected by drum 69 and hub 71 to secondary input shaft 64. The hub 71 has a cylinder 72 formed therein for the piston 73. On the supply of fluid to the cylinder by fourth clutch apply line 432, piston 73 engages the plates to effect a drive from shaft 22 to the secondary input shaft 64 to drive sun gears 43 and 48. The shaft 64 may also be held by the third speed brake 76 which has fixed plates 77 and rotary plates 78 drive connected through drum 69 and hub 71 to shaft 64 to hold shaft 64 and sun gears 43 and 48. When fluid is supplied by third apply line 436 to the cylinder 79 formed in housing 19 to move the piston 81 to apply plates 77, 78 the brake 76 is engaged to hold the shaft 64 and the sun gears 43 and 48. The second speed brake 82 has a plurality of fixed plates 83 fixed to the housing 19 and rotary plates 84 connected by a hub 85 to the carrier 47 of the third gear set. When fluid is supplied by second apply line 419 to the cylinder 86 formed in housing 19, piston 87 moves to engage the plates 83, 84 and holds the carrier 47. The first and reverse brake 89 has a plurality of fixed plates 91 secured to housing 19 and rotary plates 92 drive connected to ring gear 39. When fluid is supplied by first speed brake apply line 309 to the cylinder 93 formed in housing 19 to move the piston 94 and engage plates 91, 92 the ring gear 39 of the first gear set is held.

In all forward drives the engine driven transmission input shaft 10 is connected to shaft 22 at low output speeds by the torque multiplying drive of the torque converter and above lockup speed by the direct drive of the lockup clutch and shaft 22 is connected to primary shaft 52 by clutch 51. First, second, third and fourth speeds are provided by respectively engaging first brake 89, second brake 82, third brake 76 and fourth clutch 63. For the reverse drives fourth clutch 63 is engaged and first clutch 89 engaged for reverse one and second clutch 82 engaged for reverse two.

CONTROLS

The brakes and clutches are engaged as indicated by X on the following chart and the others disengaged to provide four, forward speeds and reverse.

| Drives | Brakes | | | Clutches | |
|---|---|---|---|---|---|
|  | 89 | 82 | 76 | 63 | 51 |
| R2 |  | X |  | X |  |
| R1 | X |  |  | X |  |
| 1 | X |  |  |  | as desired |
| 2 |  | X |  |  | as desired |
| 3 |  |  | X |  | X |
| 4 |  |  |  | X | X |

FLUID SUPPLY

Figure 6:
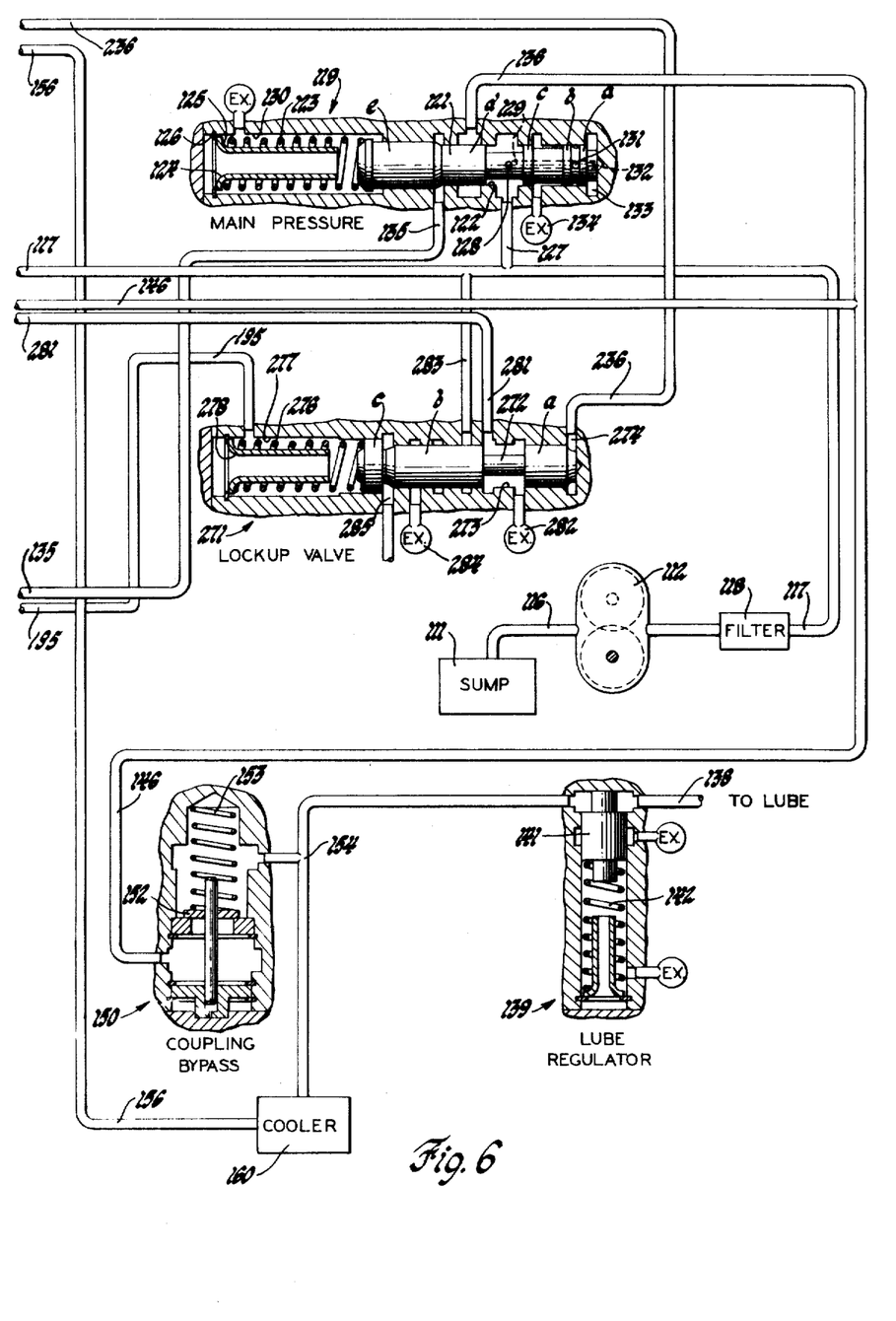

Referring to FIG. 6, the fluid exhausted from the control and lubrication system collects in the sump 111 in the lower portion of the transmission housing. A gear pump 112 draws fluid through the suction line 116 and delivers fluid to filter 118 and main line 117 and is regulated by the main pressure regulator valve 119. The main pressure regulator valve 119 has a valve element 121 having lands $a$, $b$, $c$, $d$ of equal diameter and a larger land $e$ located in a stepped bore 122. The valve element 121 is biased to the closed position shown by a spring 123 mounted on a combined spring seat and stop element 124 which is a tubular member to limit valve movement and spring compression which has a flared end 125 providing a seat for the spring and abutting snap ring 126 to retain the seat element and spring in spring chamber 130 vented to exhaust. The main line 117 has a branch 127 connected between the lands $c$ and $d$ and through port 128 and the bore 129 through the valve to the port 131 between the lands $a$ and $b$ and through a restriction to the port 132 at the end of the valve element to provide hydraulic bias in chamber 133 opposing the spring to regulate the main line pressure at a predetermined value. Regulated pressure is supplied by port 131 to the space between the lands $a$ and $b$ to prevent leakage from chamber 133 to the space between lands $b$ and $c$ vented by exhaust 134. The forward knockdown pressure line 135 is connected at the step between lands $d$ and $e$ to reduce the regulated pressure to i.e. 150 psi in all forward drive positions while pressure in reverse drive is higher, i.e. 250 psi. Excess main line pressure in line 117 and chamber 133 moves the regulator valve element 121 to the exhaust position exhausting branch 127 to overage line 136 which feeds the coupling through a coupling feed line 146. The cooler outlet line 154 is connected to the lubrication lube regulator valve 139 which has a valve element 141 biased to a closed position by a spring 142 and is closed when the overage pressure does not exceed a low value to first supply lubrication line 138. When the lubrication pressure is sufficient, overage pressure exceeds a predetermined value, i.e. 40 psi and the valve 139 opens to connect cooler outlet line 154 to exhaust. When coupling feed pressure exceeds a predetermined intermediate pressure above lubricating pressure, excess fluid in coupling feed line 146 moves valve element 152 against the bias spring 153 of coupling bypass valve 150 and lube pressure to exhaust excess coupling feed pressure to the cooler outlet line 154. The coupling outlet line 156 is connected in FIG. 6 through the cooler 160 to the cooler outlet line 154 where the pressure is limited by the lube regulator valve 139.

DETENT VALVE

Figure 5:
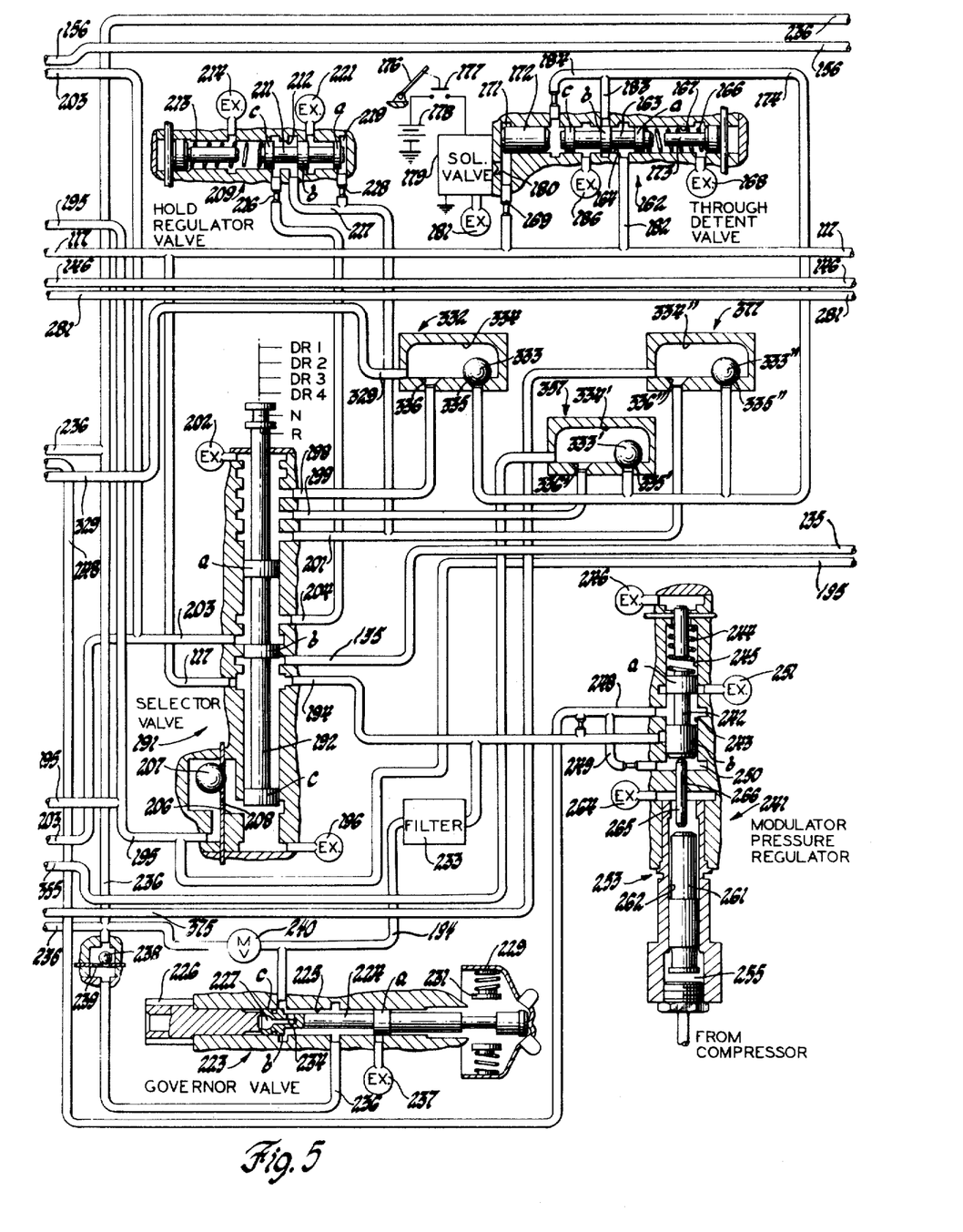

A through detent valve 162, FIG. 5, which has a valve element 163 having equal diameter lands $a$, $b$ and $c$ located in a bore 164 and is biased in an opening direction by a spring 166 located in the spring chamber 167 vented by exhaust 168. Main line pressure 117 is connected through restricted passage 169 to a chamber 171 to act on the inactivating piston 172 to normally engage valve element 163 and hold it in the extreme right position against the stop element 173 so that the through detent valve does not deliver pressure to the detent line 174. When the throttle pedal 176 is past the full throttle position, it closes switch 177 connecting a grounded power source 178 to the solenoid valve 179 which opens the port 180 to exhaust 181 to vent fluid in chamber 171 to permit the detent valve 162 to regulate pressure. The regulated pressure supplied from main line 117 via branch 182 to the space between lands *a* and *b* to the branch 183 of detent line 174 and through restricted branch 184 to the space between the piston 172 and valve element 163 to regulate detent line pressure at a predetermined low value, i.e. 38 psi, determined by spring 166. Excess pressure will move the valve element 163 against the spring 166 and connect the detent line to exhaust 186.

SELECTOR VALVE

The manual selector valve 191 has a valve element 192 having equal diameter lands *a*, *b* and *c*. In all valve positions, main line 117 is connected to the signal feed line 194. In neutral the main line is also connected to the forward knockdown line 135. The reverse selector line 195 is connected to exhaust 196. The drive one line 198, drive two line 199 and the drive three line 201 are connected to exhaust 202. The drive four line 203 is connected via hold feed line 204, hold regulator valve 209, hold pressure line 217, drive three line 201 to exhaust 202.

On movement of the selector valve 192 to the reverse position, land *c* closes exhaust 196 and opens port 206 to connect main line by fast feed ball check valve 207 and slow return restriction 208 to the reverse selector line 195. The forward knockdown line 135 is also exhausted via hold feed line 204. On movement of the selector valve to drive four position, DR4, reverse is exhausted and in addition to feeding feed line 194 and forward knockdown line 135 as in neutral, the drive four line 203 is fed while the other drive lines remain connected to exhaust as in neutral. In drive three position, DR3, the main line 117 additionally feeds the hold feed line 204 and blocks the exhaust of drive three feed line 201. In drive two position, DR2, the main line feeds the same lines and interconnects drive two feed line 199 and drive three feed line 201. In drive one position, DR1, the main line feeds the same lines and the drive one feed line 198, drive two feed line 199 and drive three feed line 201 are interconnected.

HOLD REGULATOR VALVE

The hold regulator valve 209 regulates the pressure distributed by the drive one, two and three feed lines and has a valve element 211 having equal lands *a*, *b* and *c* located in a bore 212. A spring 213 located in a spring chamber vented by exhaust 214 biases the valve 211 to the open position shown. In the open position shown, the hold feed line 204 is connected through restriction 216 to the space between lands *b* and *c* and supplies hold pressure supply line 217 which is connected to the drive three line 201. This hold pressure supply line 217 is also connected by restricted passage 218 to the closed chamber 219 at the end of bore 212 to act on land *a* of the valve element to oppose the spring bias. The pressure in chamber 219 moves the valve against the spring to connect line 217 to exhaust 221 or feed line 204 to regulate hold pressure at a valve intermediate main line pressure and detent pressure, i.e. 45 psi.

GOVERNOR

The governor valve 223 has a valve element 224 having equal lands *a*, *b* and *c* mounted in a bore 225 and is rotatably driven by a gear 226 driven from output shaft 99 by a spline connector 227 which permits axial movement of the valve element 224 under the influence of the rotating governor weights 229 and secondary weights 231 which provide a stepped pressure varying with output or vehicle speed. Fluid pressure supplied by the signal feed line 194 through filter 233 is connected between lands *a* and *b* and by a passage 234 through the valve element to the end valve element 224 to act on the end of the valve element to move it to an exhausting position connecting governor signal line 236 to exhaust 237 against the opposing force of the governor weight. The force of the governor weight overcomes the pressure to move the valve to the left connecting signal feed line 194 to governor line 236 and closing exhaust 237. The one way check valve 238 permits fast flow of the governor signal pressure to the shift valves and the return restriction 239 only permits slow return flow so the governor pressure line has fluid flow to supply without pressure drop, the expanding governor pressure chambers when shift valves upshift and reduce return flow to prevent sharp reduction of governor pressure due to drive line shock.

MANUAL SIGNAL VALVE

A manual signal valve 240, FIG. 5, is normally closed but may be opened to connect signal feed line 194 to governor line 236 to supply main line pressure, a manual signal pressure, to the governor line. The main line pressure is always considerably higher than the highest governor pressure so the manual signal pressure at the main line pressure value can be used to manually upshift governor controlled shift valves. When the selector valve 191 is in a forward position main line pressure in the governor signal line 236 will upshift the lockup clutch valve 271 and upshift the 1-2 shift signal valve 316, 2-3 shift signal valve 341 and 3-4 shift signal valve 358 and thus the 1-2 relay valve 378, 2-3 relay valve 406 and the 3-4 relay valve 424 to positively manually establish lockup drive in the fourth gear ratio for a push start drive. When the selector valve 191 is in reverse position main line pressure in the governor signal line 236 will upshift the reverse on two shift valve 286, as chamber 290 is exhausted by drive four line 203 but will not upshift the lockup shift valve 271, the 1-2 relay valve 378 and the 3-4 shift signal valve 358 as reverse pressure line 195 is connected to their respective spring chambers 277, 384 and 365 so the springs 276, 382 and 364 retain these valves in the downshift position for reverse drive even through main line pressure is acting in an upshift direction.

MODULATOR PRESSURE REGULATOR

The modulator pressure regulator 241, FIG. 5, provides a pressure inversely proportional to torque demand and has a valve element 242 having equal lands *a* and *b* mounted in a bore 243. The spring 244 located in a spring chamber 245 vented by exhaust 246 biases the valve element to the open position connecting signal feed line 194 between the lands to the modulated signal line 248 which is connected by a restrictive passage 249 to the chamber 250 at the end of the bore 243 to act on the end of land *b* to bias the valve element to connect modulator line 248 between lands *a* and *b* to exhaust 251, to regulate the modulated signal pressure inversely proportional to engine load or the force delivered by compressor discharge actuator 253.

The modulator pressure regulator valve 241 is controlled by an actuator 253 consisting of an actuator stem 261 which is reciprocally mounted in a bore 262 in the end wall of the valve body which is vented by exhaust 264. A chamber 255 is adjacent the end of stem 261 and is connected to the compressor of the gas turbine to permit compressor discharging pressure, which is proportional to engine power developed, to act on the stem 261. The stem 261 engages a pin 265 reciprocally mounted in a bore 266 in the valve body to engage the valve element 242. The force of the actuator stem 261 is proportional to the compressor discharge and thus increases with increasing compressor discharge pressure and acts through the stem 261 and pin 265 on the valve element 242 and with the regulated pressure in opposition to the valve spring 244 to provide a regulated torque demand pressure inversely proportional to actuator force, or compressor discharge pressure.

LOCKUP VALVE

The lockup shift valve 271, FIG. 6, has a valve element 272 having lands $a$, $b$ and $c$ reciprocally mounted in a stepped bore 273. The governor pressure line 236 is connected to closed chamber 274 to act on the end of land a to bias the valve against the bias of spring 276 located in a chamber 277 vented by reverse line 195 to exhaust 196 in forward drive and having a stop and spring seat member 278. Port 285 between lands $b$ and $c$ is exhausted. In some transmission designs, it is desirable to have the lockup valve shifted in drive one. In these transmissions the drive one line 198 is connected with the port 285 so that line pressure will upshift the lockup valve. With the lockup valve in a downshift position shown, lockup apply line 281 is connected to exhaust 282 to disengage the lockup clutch 23. This valve is upshifted by governor pressure in an upshifted direction and overcoming the bias of the spring in a downshift direction. The lockup valve provides the shifts at a fixed output speed. In the upshifted position main pressure in lockup feed line 283 is connected between the land $a$ and $b$ of the upshifted lockup valve to lockup clutch apply line 281 to engage the lockup clutch. The land $b$ is slightly larger than land $a$ so the main line pressure connected to the lockup clutch provides a hysteresis force, so downshifts are at lower speeds. The exhaust 282 is then closed. The exhaust 284 permits leakage fluid to escape. When the selector valve 191 is in reverse position, pressure in reverse line 195 and the spring chamber 277 holds the lockup valve 271 in downshift position.

Figure 4:
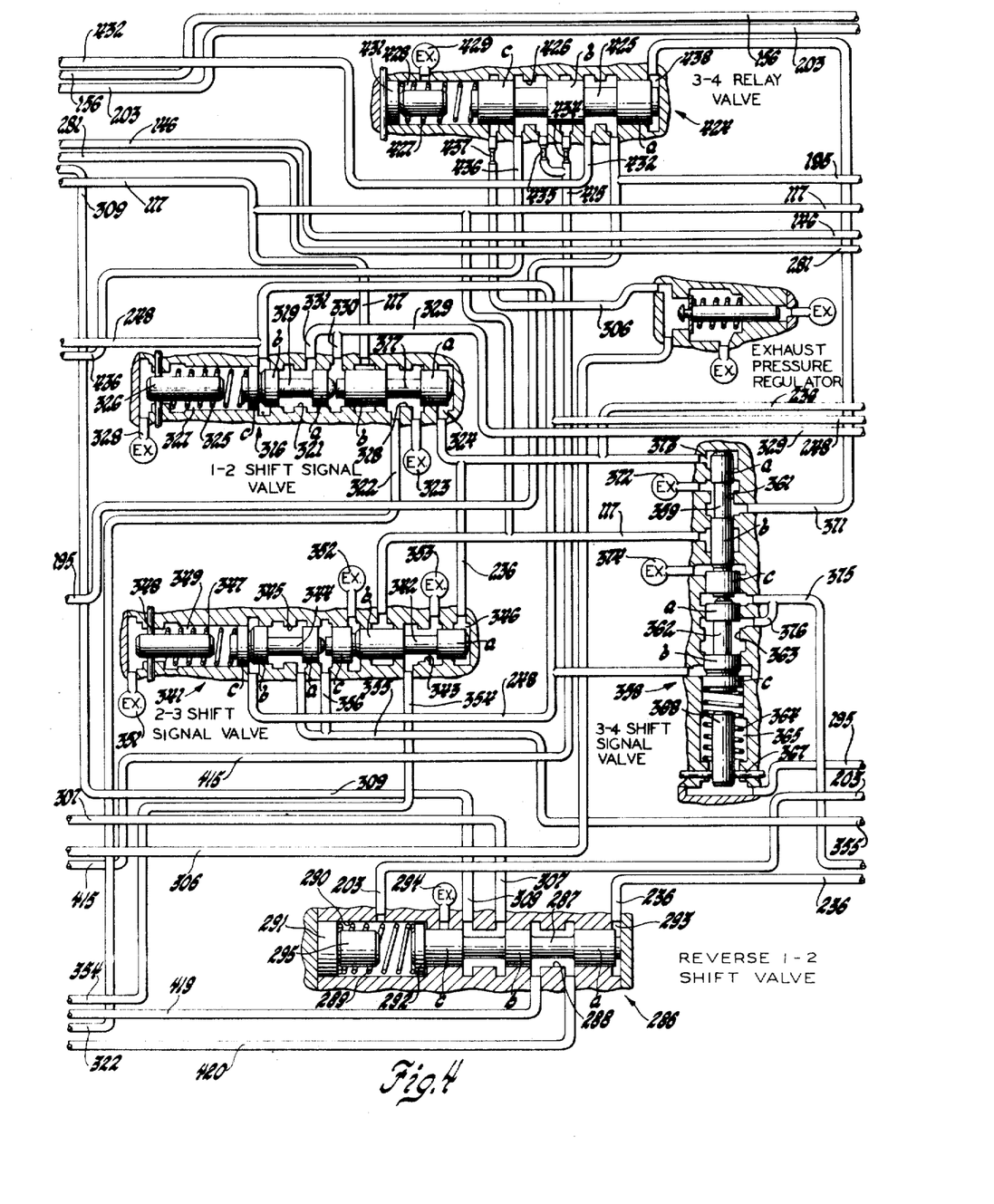

The reverse one two shift valve 286, FIG. 4, controls the reverse one to reverse two shift by selective engagement of the first brake 89 and second brake 82 in response to speed. The reverse one two shift valve 286 has a valve element 287 having small land $a$ and slightly larger equal diameter lands $b$ and $c$ slidably mounted in a stepped bore 288. A spring 289 is located in the enlarged spring chamber 290 portion of the bore 288 and seated on the valve body fixed end plate 291 and the seat member 292 fixed on the free end of land 287$c$ which has clearance with bore 290 to bias the valve element 287 to the reverse first position shown. The governor pressure line 236 is connected to the closed chamber 293 at the other end of the valve to act on the free end of land 287$a$ to bias the valve element to the reverse second position engaging the free valve stop and spring guide member 295. The drive four line 203 supplies main line pressure to the closed spring chamber 290 in all forward positions of the selector valve to act on land $c$ with spring 289 to positively hold the reverse 1–2 shift valve 286 in the reverse first position in all forward drives against the small hysteresis force in second forward and any governor pressure or main line pressure in governor pressure chamber 293 respectively during forward or push start operation. When the selector valve is in reverse position the drive four line 203 is exhausted at the selector valve permitting governor pressure in chamber 293 to upshift the reverse one two shift valve 286 at the reverse one two upshift speed. The hysteresis force on the differential area between lands 287 $a$ and $b$ causes the reverse second to first downshift to occur at a slightly lower speed to prevent hunting.

In the reverse one two shift valve 286 in the downshifted position shown the first feed line 307 is to the space between lands 287$b$ and $c$ adjacent land $b$ and the first apply line 309 is connected between lands 287$b$ and $c$ adjacent land $c$. The second apply line 419 is connected between lands 287$a$ and $b$ adjacent land $b$ and the second feed line 420 is connected between lands 287$a$ and $b$ adjacent land $a$. Thus in the downshifted position, occurring in all forward drives and reverse first, the first feed line 307 is connected to the first apply line 309 and the second feed line 420 is connected to the second apply line 419. On an upshift to second revere the first feed line 307 is connected between lands $a$ and $b$ causing hysteresis to second apply line 419. The first apply line 309 is connected to exhaust 294 and second feed line 420 is blocked by land 287$a$.

ONE TWO SHIFT SIGNAL VALVE

Automatic shifting between first to fourth speed forward drives is provided by a speed and engine load signal controlled shift signal valves, one fo each speed change, each having an associated relay valve. The shift and relay valves for each speed change are similar but are individually described with the connections and then the basic function of operation is discussed.

The one two shift signal valve 316, FIG. 4, has a valve element 317 having land $a$ and larger land $b$ in a stepped bore 318 and a control element 319 having lands $a$, $b$ and $c$ of increasing diameter from $a$ to $c$ mounted in a stepped bore 321. The land $b$ of valve element 317 is larger than land $a$ so that when the valve is moved from the downshift position shown in FIG. 4 to the upshift position connecting main line 117 to the one two signal line 322 for a shift to second speed, there is an added hysteresis force in an upshift direction on the valve. In the downshift position shown, the one two signal line 322 is connected to exhaust 323 and this hysteresis force is dropped. In both downshift and upshift positions, governor pressure from line 236 enters chamber 324 at the end of bore 318 and acts on land $a$ of valve element 317 in an upshift direction. Also modulator pressure line 248 is connected to the stepped bore between the large land $c$ and the smaller land $b$ of control element 319 to also provide an upshift direction force. Both the governor and modulator upshift direction forces are opposed by the downshift direction force of spring 325 which is mounted on a suitable spring seat and stop assembly 326 in a spring chamber 327 vented by exhaust 328. When governor pressure and modulator forces overcome the spring force, both valve elements upshift and the modulator pressure from line 248 is also connected between land $a$ and $b$ of the control valve element 319. Since land $b$ is larger than the land *a* there is an additional area and upshift force after upshifting to control the downshift. The two one downshift line 329 may supply either hold pressure from the drive one line 198 or detent pressure from detent line 174 and is connected via branch 330 to hold the shift valve element 317 in the downshift position when downshifted or via branch 331 when the valve element is upshifted to downshift the shift valve element at a predetermined speed. The regulated hold pressure supplied is insufficient to downshift above a predetermined speed for a proper shift.

The two one downshift line 329 is supplied in a detent position of the throttle pedal by detent valve 161 and detent line 174. If the slightly higher hold pressure from hold regulaor valve 209 is connected by the selector valve 191 in the drive one position to drive one line 198, the one two shuttle valve 332 blocks detent line 174 and connects hold pressure from drive one line 198 to downshift line 329. The shuttle vlave 332 has a ball 333 located in a chamber 334 having a bottom surface having depressed seat port 335 at the entry of detent line 174 to the chamber and closely adjacent depressed seat port 336 at the entry of drive one line 198. The downshift line 329 is connected to chamber 334 by a port that is wide and positioned so it cannot be blocked by ball 333. When pressure is supplied to one of seat ports 335 or 336, the ball will seat in and close the other. The chamber has a rounded upper surface particularly at the ends to guide the ball into the seat ports and the height of the chamber between the seat ports should be only slightly greater than the ball diameter.

TWO THREE SHIFT SIGNAL VALVE

The two three shift signal valve 341 has a valve element 342 having lands *a*, *b* and *c* of increasing diameter from *a* to *c* in a stepped bore 343 and a control element 344 having lands *a*, *b* and *c* of increasing diameter from *a* to *c* in a stepped bore 345. In both the up and down shift positions of the shift valve, the governor pressure line 236 is connected to the chamber 346 to provide an upshift direction force and the modulator pressure line 248 is connected between the lands *b* and *c* of control element 344 to act on the excess area of land *c* to provide an upshift force against the downshift direction force of spring 347 mounted on a seat assembly 348 in the spring chamber 349 which is vented by exhaust 351. Exhaust 352 vents a space between lands *b* and *c* of valve element 342. Exhaust 353 exhausts the two three signal line 354 with the valve element 342 in the downshift position shown so there is no two three signal pressure for a shift to third. On an upshift exhaust 353 is closed and main line 117 is connected to the two three signal line 354. With the shift valve 342 and control valve 344 in the downshift position shown or upshift position, governor pressure from line 236 in chamber 346 acting on land *a* and modulator pressure from line 248 acting on land *c* of control valve 344 provides an upshift direction force against the downshift force of spring 347 to provide upshifts. When the governor pressure and modulator pressure overcome the spring force, the shift valve 342 and control valve 344 move to the upshift position. The main line pressure acting on land *b* which is larger than land *a* provides an upshift hysteresis force and modulator pressure acting on land *b* provide an added upshift force to provide downshifts at speeds lower than upshift speeds. The three two downshift line 355 in the downshift position of the shift valve and the branch 356 in upshift position of the shift valve is connected to the valve bore between the shift valve element 342 and the control valve element 344, for downshifting the shift valve element when supplied with hold or detent pressure. The detent pressure line 174 and the hold pressure via drive two line 199 are connected to the two three shift shuttle valve 357 which has the same structure as the one two shuttle valve 332 and thus has the same reference numbers primed. When the throttle pedal is in detent position providing detent pressure in line 174 shuttle valve 357 connects this pressure to the three two downshift line 355 but if the selector valve 191 is in drive three or two positions providing hold pressure in line 199 this pressure is supplied to downshift line 355 and detent pressure blocked.

THE THREE FOUR SHIFT SIGNAL VALVE

The three four shift signal valve 358, FIG. 4, has a shift valve element 359 having lands *a*, *b* and *c* located in a stepped bore 361 and a control valve element 362 having lands *a*, *b* and *c* in a stepped bore 363. The lands of both valve elements have sequentially increasing diameters from *a* to *c*. Both valve elements are biased to the downshift position by a spring 364 located in a spring chamber 365 vented to exhaust through reverse line 195 in neutral and forward drives. In reverse drive the selector valve 191 supplies pressure through reverse line 195 to place the three four shift signal valve 358 in third or downshift position. The spring is seated on an adjustable seat 367 and having a stop pin 368 limiting valve movement. In the downshift position, shift valve element 359 blocks main line 117 and connects the three four shift signal line 371 to exhaust 372. In this position governor pressure acting in chamber 373 on the land *a* of valve element 359 and modulator pressure line 248 acting on the land *c* of control valve element 362 provide a force in the upshift direction against the downshift direction force of the spring 364. When governor and modulator pressure overcomes the spring force, the valve elements upshift. In upshift position land *a* of valve element 359 blocks exhaust 372, main line 117 is connected to the three four shift signal line 371 and the main line pressure between lands *a* and *b* acts on the larger area of land *b* to provide a primary additional upshift hysteresis force. In addition, modulator pressure also acts on land *b* of control valve element 362 to provide an additional upshift force causing downshifts at lower speeds. The exhaust 374 vents the valve bore between the downshift line 375 and main line 117. Hold or detent pressure in three four downshift line 375 and its branch 376 is connected between the valve elements when in the downshift and upshift position respectively to position valve element 359 in a downshift position at proper speeds. When detent pressure is supplied to line 174 the three four shuttle valve 377 connects it to four three downshift line 375 unless the selector valve is in drive one, two or three position and supplies the higher hold pressure to drive three line 201 which is then connected to downshift line 375 and detent pressure is blocked. This shuttle valve 377 has the same structure and operation as shuttle valve 332 so the parts have the same reference numerals double primed.

ONE TWO RELAY VALVE

Figure 3:
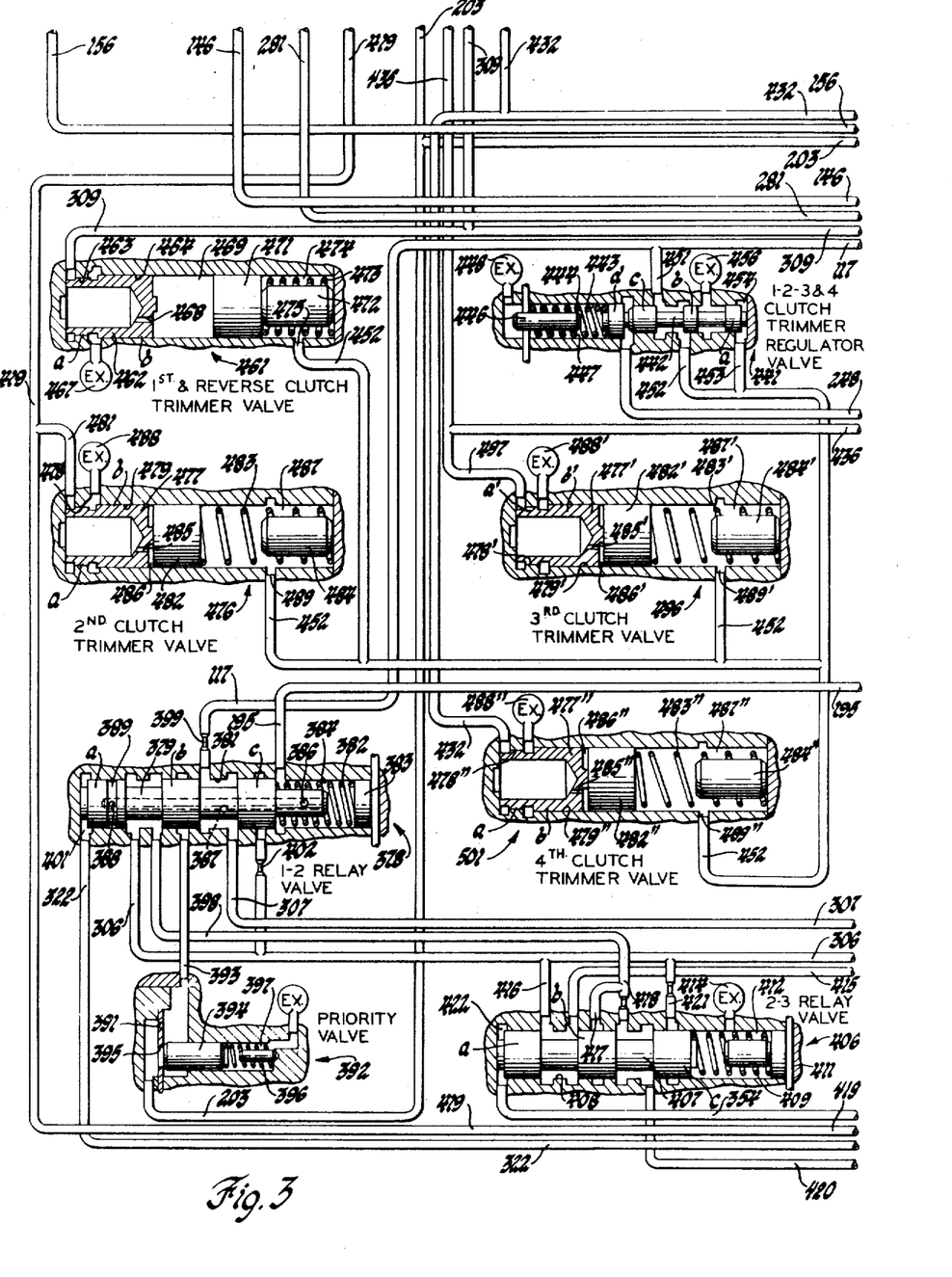

The one two relay valve 378, FIG. 3, has a valve element 379 having equal diameter lands *a*, *b* and *c* located in a bore 381 and is biased to the first speed position shown by a spring 382 seated on the spring seat 383 located in a closed chamber 384. The chamber 384 is connected by a port 386 and a passage 387 through the valve element to a port 388 located in a groove 389 in the land *a* to exhaust the chamber in the upshift position. Main line pressure supplied from the selector valve 191 to the drive four line 203 is always connected through restriction 391 in the priority valve 392 to the priority main line 393. The priority valve has arranged in parallel with restriction 391 a relief valve having a valve element 394, closing port 395 under the bias of spring 396 in vented chamber 397 when the pressure in main line and drive four line 203 is insufficient for properly operating the transmission and open when the pressure is sufficient. The valve will close momentarily during shifts involving engagement of second, third and fourth in forward drives to maintain sufficient main line feed pressure to the modulator valve 241 and governor valve 223. The restriction 391 provides an exhaust connection in neutral position of the selector valve.

Relay valve 378 in the first speed position shown, connects the one two shift line 398 to exhaust line 306, blocks priority drive four line 393, connects the main line 117 via restriction 399 between the lands *b* and *c* to the first feed line 307, blocks restricted branch 402 of exhaust line 306 at the land *c* and connects reverse drive line 195 from the manual selector valve adjacent land *c* to the spring chamber 384 which is closed since passage 387 is blocked. When the one two shift signal valve 321 provides pressure in the one two signal line 322 to supply fluid to the closed chamber 401, valve element 379 is moved against the bias of the spring except in reverse to the second speed position. Then spring chamber 384 is connected via passage 387 to exhaust line 306, priority drive four line 398 is connected to the one two shift line 398, main line 117 is blocked by land *b*, the line 307 is connected via restricted branch 402 to exhaust line 306 and reverse line 195 is blocked by land *c*.

TWO THREE RELAY VALVE

The two three relay valve 406 has a valve element 407 having equal diameter lands *a*, *b* and *c* located in a bore 408 and biased by a spring 409 to the downshift or second speed position shown in FIG. 3. The spring is seated on a seat and pin assembly 411 in a chamber 412 vented by exhaust 414. When the relay valve is biased by the spring to the second speed position, the two three shift feed line 415 is connected between lands *a* and *b* via branch 416 to exhaust line 306, one two shift line 398 has unrestricted branch 417 blocked by land *b* and the restricted branch 418 connected between lands *b* and *c* to the second feed line 420 and restrictive branch 421 of the exhaust line 306 is blocked by land *c*. When the two three shift signal valve 341 supplies the two three shift signal line 354 pressure to chamber 422, the two three relay valve element moves against the spring 409 to the stop pin and exhaust branch 416 is blocked by land *a*. The one two shift signal line 398 via branch 417 is connected to the two three shift line 415, the restricted branch 418 is blocked by land *b* and the second feed line 420 is connected via restricted branch 421 to exhaust line 306.

THREE FOUR RELAY VALVE

The three four relay vlave 424 has a valve element 425 having equal diameter lands *a*, *b* and *c* located in a bore 426 and is biased by a spring 427 to the third position shown in FIG. 4. The spring is located in the chamber 428 vented by exhaust 429 and seated on a seat and valve stop assembly 431. When the valve element 425 is biased to the third position shown by the spring 427, reverse drive line 195 is connected between the lands *a* and *b* to the fourth clutch lines 432, the two three shift signal line 415 has restricted branch 434 blocked by the land *b* and restricted branch 435 connected between lands *b* and *c* to the third brake line 436 and the exhaust line 306 connected by restriction 437 is blocked by land *c*. When the three four shift signal valve 358 provides a signal pressure in the three four shift signal line 371 to the chamber 438, this pressure acts on land *a* moving the valve to the fourth speed position. Then reverse drive line 195 is blocked by land *a*, two three shift line 415 is connected by restrictive branch 434 to the fourth clutch line 432 and branch 435 is blocked by land *b* and the third brake line 436 is connected via restriction 437 to exhaust line 306.

TRIMMER REGULATOR VALVE

The trimmer regulator valve 441, FIG. 3, has a valve element 442 having equal diameter lands *a*, *b*, *c* and larger land *d* located in a stepped bore 443 and is biased to the feed position shown by a spring 444 seated on an abutment and stop pin assembly 446 located in a spring chamber 447 vented by exhaust 448. With the valve element 442 in the feed position shown, main line 117 branch 451 is connected between the lands *b* and *c* to the trimmer regulated pressure line 452 which is connected by branch 453 which may be restricted to the closed chamber 454 to act on the end of land *a* and oppose the spring bias and regulate the pressure. When the trimmer regulated pressure exceeds the regulated value, it will move the valve element 442 to the left connecting trimmer regulator pressure line 452 between lands *a* and *b* to exhaust 456. The modulator pressure line 248 is connected between the lands *c* and *d* to act on the unbalanced area of land *d* opposing the spring. Increasing modulator pressure provides a proportionately reduced trimmer regulator pressure. Since modulator pressure varies inversely with engine load and is a maximum at idle and reduces to zero at a high throttle position, the trimmer regulator pressure is low at idle or at low torque demand values and increases proportionately to increasing torque demand to a high torque demand where the highest trimmer regulator pressure is determined by the spring force and the area of land *a* of trimmer regulator valve element 442.

TRIMMER VALVES

The first and reverse drive trimmer valve 461 has a trimmer regulator element 462 having a small land *a* and large land *b* located respectively in small bore 463 and large bore 464. The first brake apply line 309 is connected to the end of the bore 463 and acts on land *a* to bias the valve to the right to the open position connecting first brake apply line 309 to exhaust 467 to reduce the pressure. First brake apply pressure from line 309 is also continuously connected through restriction 468 to the space 469 between the regulating valve element 462 and an actuator plug 471 which is shown seated on a stop member 472 fully compressing the spring 473 located in a closed chamber 474 having trimmer regulator pressure connected thereto at a port 475 below the stop and thus never blocked by plug 471. When line 309 is vented, spring 473 is extended with plug 471 engaging regulator valve element 462. On the initial supply of fluid to the first brake by first brake apply line 309, pressure acts on regulator valve element 462 and is regulated at a low pressure value determined by the trimmer regulator pressure which increases with increasing torque demand and the minimum spring force at full height in the valve assembly. At the same time fluid slowly flows through restriction 468 to fill and enlarge the space 469 to gradually separate the regulator valve element and plug so that the spring 474 is more and more compressed to gradually increase the regulated pressure at a rate determined by the restriction and spring rate until the maximum regulated pressure is provided with the valve elements in the position shown for gradual engagement of the friction devices. Then the pressure quickly increases to main line pressure. The valve will remain in this position until the first brake apply line 309 is exhausted and the valve will return to the initial position. The use of trimmer regulator pressure makes it possible to individually set the low pressure and rate of pressure rise to meet the requirements of each friction device with the same valve structure and springs fitting therein.

The second speed trimmer valve 476 similarly has a regulator valve element 477 having small land a and large land b respectively located in small bore 478 and large bore 479. Second brake pressure in line 419 is connected by branch 481 to the end of bore 478 and acts on the land a to move the regulator valve 477 and the plug 482 against bias of spring 483 and trimmer regulator pressure from line 452 and port 489 in chamber 487 to connect line 481 to exhaust 488 to reduce the pressure. The stop element 484 limits movement of the plug 482 and compression of the spring 483. When pressure is supplied via line 481 to the bore, it also flows through restriction 485 to the space 486 between the regulator valve and plug to enlarge this space to increase the spring force to gradually increase the pressure line first and reverse drive trimmer valve 461.

The third speed trimmer valve 496 has the same construction and function. Primed numbers from the second speed have been used to indicate like parts. This valve controls the third brake apply line 436 pressure which is connected by branch 497 and acts on the land a' of regulator valve element 477' which moves to open exhaust 488'. The trimmer regulator pressure line 452 is connected to port 489'. The fourth clutch trimmer valve 501 is similar to the above trimmer valves and functions in the same way and thus the same reference numerals with double primes have been used. The fourth clutch trimmer valve 501 regulates the fourth clutch pressure in line 432 and exhausts the excess to exhaust 488'' and is controlled by trimmer regulator pressure from line 452 connected to port 489''.

OPERATION

When the engine driving this transmission is running, the transmission input driven pump 112, FIG. 6, supplies fluid under pressure to the main line 117 which is regulated at a normal line pressure value, i.e. 150 psi, when the transmission is in forward drive and forward drive knockdown pressure is supplied via line 135 to the regulator valve and at a higher reverse drive pressure, i.e. 250 psi, in reverse drive when this knockdown pressure is not supplied. The regulator valve exhaust line 136 is connected through torque converter feed line 146 to fill the torque converter for drive and through both the torque converter outlet 156 and cooler 160 and through bypass valve 150 to the lubrication line 138 which lubricates the transmission gearing.

In neutral position, the manual selector valve 191 supplies fluid to the forward knockdown line 135 and the signal feed line 194 and the other lines, reverse 195, first 198, second 199 and third 201 drive lines are connected to exhausts 196 or 202 directly, while the drive four line 203 is connected to the hold feed line 204 and both are exhausted via the hold regulator valve 209 and the drive three feed line 201 to exhaust 202. As explained above, the trimmer regulator valve 441 will supply trimmer regulator pressure to line 452, the modulator pressure regulator valve 241 will provide modulator pressure in line 248 inversely proportional to engine load or torque demand and the transmission output governor valve 223 will provide a governor signal in line 236 that is a function of output speed. The hold pressure regulator valve is not supplied and thus there is no hold pressure in line 217 and there is no detent pressure in line 174.

Normally when the selector valve is in neutral position the output or vehicle driven thereby will be stationary or nearly so as the engine is running to pressurize the system as pointed out above, the governor pressure and modulator pressure will be insufficient to overcome the downshift bias of the springs so the one two, two three and three four shift signal valves 316, 341 and 358 will be in the downshift position connecting the one two, two three and three four shift signal lines 322, 354 and 371 to exhausts 323, 353 and 372 respectively. The main line 117 is directly connected to each shift signal valve and blocked by land b thereof. Since there are no shift signal pressures the one two, two three and three four relay valves 378, 406 and 424 are spring biased to the downshift or lower speed position. As the reverse line 195 is connected to exhaust, the fourth clutch 63 is disengaged and the lockup clutch shift valve 271, the three four shift signal valve 358 and the one two relay valve 378 are conditioned for normal shifting but at low speeds are in the downshift position. The drive four line 203 is exhausted so the forward clutch 51 is disengaged and the reverse one two shift valve is operational but downshifted at low speeds. The main line 117 is connected by the downshifted one two relay valve 378 to the first feed line 307 which is connected by the reverse one two valve 286 to apply the first brake 89 but since all other clutches and brakes are disengaged the transmission is in positive neutral.

If the output or vehicle is coasting at higher speeds, with the selector valve 191 inadvertently in neutral and the engine running the automatic output governor and modulator pressure control system will function as during automatic shifting described below to position the shift signal valves and relay valves in accordance with speed and torque demand. When the one two relay valve 378 upshifts, first brake apply line 309 is connected by the neutral one relay valve 298 to the line 307 which is connected by the one two relay valve 378 to exhaust 402 to disengage the first brake 89. Since drive four line 203 is exhausted at the selector valve in neutral position, the second and third brakes and fourth clutch cannot be applied. Thus on movement of the selector valve to a drive position, pressure in drive four line 203 will first insure that the reverse one two shift valve is downshifted, then the forward clutch will be engaged and then the priority valve 392 will supply fluid to then engage the drive speed selected by the automatic controls. The drive and coasting shift engagement sequence is the same, the drive always being completed by the first, second, third or fourth speed engagement device.

On shifting the manual selector valve 191 to the drive four position, DR4, at the output speeds and engine load values insufficient to upshift the one two shift signal valve 316, since the main line 117 was directly connected in neutral by the downshifted one two relay valve 378 to first feed line 307 which is connected by the downshifted reverse one two shift valve 286 to first apply line 309 to engage the first brake 89, pressure in drive four line 203 engages forward clutch 51 for first gear drive. Thus when the output or vehicle is standing the forward clutch 51 and first brake 89 are engaged and the torque converter provides a slipping connection between the engine and the gear train. The drive four line also supplies fluid to the priority valve 392 which feeds the drive four priority line 393 which in the first speed position of the one two relay valve 378 is blocked by land b.

The other drive establishing devices are exhausted to disestablish the other drives. The second speed brake apply line 419 is connected by the downshifted reverse one two shift valve 286 to the second feed line 420 which is connected by the two three relay valve 406 to one two shift feed line 398 which is connected by downshifted one two relay valve 378 to the exhaust line 306 for disestablishing the second speed brake 82. The third speed brake apply line 436 is connected by the downshifted three four relay valve 424 to the restricted branch 435 and two three shift feed line 415 which is connected by the downshifted two three relay valve to the exhaust branch 416 and line 306 to disengage third brake 76. The fourth speed clutch apply line 432 is connected via the downshifted three four relay valve 424 to the reverse line 195 which is connected to exhaust at the selector valve 191 to disengage the fourth clutch 63. The lockup clutch 23 is exhausted via the lockup valve 271.

When the speed of the vehicle has increased sufficiently, the governor pressure in line 236 will cause the lockup valve 271 to upshift. When this occurs, the lockup apply line 281 will be connected to main line 117, thereby pressurizing the lockup clutch 23. With the lockup clutch 23 engaged, the drive from the engine bypasses the torque converter to directly drive the turbine shaft 22.

When the speed of the vehicle increases, so that governor pressure in line 236 upshifts the one two shift signal valve 316 against the spring bias reduced by modulator pressure from line 248, the exhaust 323 is closed and the main line 117 supplies pressure to the one two shift signal line 322 which acts in chamber 401 to upshift the one two relay valve 378 from the downshifted position against the spring bias to the upshifted position. Upshifted one two relay valve 378 connects the first feed line 307 which had engaged first speed via the reverse one two valve 286 to the exhaust 402 to line 306 to disengage first speed and connects the priority main line 393 between lands a and b to the one two shift feed line 398 which is connected by the restricted branch 418 between the lands b and c of the downshifted two three relay valve 406 to the second feed line 420 and by the downshifted reverse one two valve 286 to the second brake apply line 419 for engagement of the second speed.

At a higher speed, governor pressure similarly upshifts the two three shift signal valve 341 which will disconnect the second, third shift signal line 354 from exhaust 353 and connect it to main line. The second third shift signal line 354 is connected to chamber 422 of two three relay valve 411 to upshift this valve to the upshift position connecting the second feed line 420, connected through the reverse one two valve 286 to the second braking line 419, by restricted exhaust 421 to the low pressure exhaust line 306 to disengage second drive and connect the unrestricted branch 417 of the one two shift line 398 to the second third shift feed line 415 which is connected via restricted branch 435 and between the lands b and c of downshifted three four relay valve 424 to the third brake apply line 436 to engage third speed drive.

At a still higher speed the governor pressure will upshift the three four shift signal valve 358 to disconnect the three four shift signal line 371 from exhaust 372 and connect it to main line 117 to supply pressure to the chamber 438 to upshift the three four relay valve 424. This upshifted relay valve will then connect third brake apply line 436 to restricted exhaust 437 and the low pressure exhaust line 306 and connect the two three shift feed line 415 via restriction 434 to the fourth clutch apply line 432 to engage fourth speed drive.

Since the drive four line via the priority valve 392 and priority drive four line 393 sequentially feeds the one two, two three and three four relay valves only one of the first, second, third and fourth speeds can be engaged and failure of any shift relay valve to upshift will prevent engagement of all higher speed drives. Since the shift signal valves upshift sequentially with increasing speeds, the drives will be changed in this sequence.

A reduction of governor pressure and/or modulator pressure will effect a downshift of the shift signal valves sequentially, the three four shift signal valve, the two three shift signal valve and then the one two shift signal valve to provide the reverse of the above described upshifting operation and thus provide downshifting in this sequence.

When the throttle pedal is in the through detent position which may be either just prior to, at, or just beyond full throttle position through detent valve 162 supplies to the detent line 174 fluid at a regulated pressure to each of the four three shuttle valve 377, three two shuttle valve 357 and two one shuttle valve 332. If the hold feed pressure supplied by line 204 in the manual valve via the drive three line 201 drive two line 199 and drive one line 198 respectively is present in any of these valves the detent pressure being lower will be ineffective and remain blocked. However, if the hold feed pressure is not present in any of these valves, the detent pressure will, as explained above, move the ball 333 from the detent line 335 to the hold feed pressure seat 336 and the detent pressure will be connected to the downshift line connected to that shuttle valve. As pointed out above, the four three downshift line 375, the three two downshift line 355 and the two one downshift line 329 are respectively connected to the three four shift signal valve 358, the two three shift signal valve 341 and the one two shift signal valve 316 and will provide up and down shifts of each of these shift valves at a higher speed than the normal shift speeds and remove the normal downshift bias by the spring modified by modulator pressure.

Movement of the manual selector valve 191 to the drive three position, DR3, in addition to supplying the previously supplied signal feed line 194, forward knockdown line 135 and drive four line 203 also feeds the hold feed line 204 and blocks the exhaust of the drive three feed line 201. Thus the hold pressure is regulated by the hold regulator valve 291 when supplied with main line pressure by the hold feed line 204 and supplies hold pressure via line 217 to the drive three feed line 201 which is connected by four three shuttle valve 377 regardless of the presence or absence of detent pressure to the four three downshift line 375 which will downshift the three four shift signal valve at a higher speed than detent pressure. The shift valves control the slave valves for shifting the transmission as in automatic drive but up and down shifts from third to fourth speed occur at a higher speed. Thus normal power driving would be limited to first to third speeds but coast upshifts to fourth are permitted.

Movement of the manual selector valve 191 to the drive two position, DR2, will additionally interconnect the drive three line 201 to supply hold pressure to the drive two line 199 which will be connected by the three two shuttle valve 357 to the three two downshift line 355 which similarly acts on the two three shift signal valve 341 to control the two three relay valve 406 for shifting the transmission at a higher speed than detent shifting, so normal power one two shifts are provided with coast upshifts to third and fourth.

Movement of the manual selector valve 191 to the drive one position, DR1, additionally connects hold pressure from drive three feed line 201 to the drive one line 198 which is connected by the two one shuttle valve 332 to the two one downshift signal line 329 which acts on the one two shift signal valve 316 to control the one two relay valve 378 to shift the transmission between first and second speeds at higher speeds than the detent downshift to normally hold first speed but permit coast upshifts. As mentioned above, line 198 may also be connected at port 285 to engage the lockup clutch.

In order to make a shift to reverse the selector valve must be first moved to neutral, placing the control system in the above described neutral condition, and then to reverse R. In the reverse position R the selector valve 191 exhausts the drive four line 203 and forward knockdown line 135 through the hold feed line 204, the hold regulator valve 209 and drive three line 201 to exhaust 202. Exhausting the forward knockdown line 135 causes main pressure regulator valve 119 to increase main line pressure in line 117 to a higher value, i.e. 250 psi. The forward clutch 51, the second brake 82 and the third brake 76 are exhausted through the drive four line 203. It also exhausts the normal forward drive feed through the relay valves, which through the two three shift line 415 with the three four relay valve 424 upshifted feeds the fourth clutch apply line 432 or when downshifted the third brake apply line 436. To establish the first or the second reverse drive both the one two relay valve 378 and the three four relay valve 424 must be downshifted. The selector valve 191 in reverse position connects main line 117 to reverse line 195, which with the three four relay valve 424 in the downshift position is connected to the fourth clutch apply line 432 to engage the fourth clutch.

In addition to establishing first or second reverse the first brake 89 or the second brake 82 respectively must be applied.

On the selector valve 191 being shifted to reverse, the exhaust of the drive four line 203 exhausts spring chamber 290 of the reverse one two shift valve 286 to unblock this valve and permit normal speed responsive shifting by governor pressure supplied by line 236. The reverse one two shift valve 286 is in the downshifted or first reverse position at the low speed at which the one two shift signal valve 316 downshifts and thus downshifts the one two relay valve 378. When the one two relay valve 378 downshifts to first position the reverse pressure line 195 is connected to chamber 384 to hold one two relay valve 378 in first position. The one two relay valve in first position connects the one two shift feed line to exhaust 306, so the feed system for higher ratios used in forward is deactivated and connects main line 117 to first feed line 307 which is connected by the reverse one two shift valve 286 to the first apply line 309 to apply first brake 89 to establish first reverse drive. As the speed increases and at a higher speed the governor pressure in line 236 upshifts the reverse one two shift valve to connect first apply line 309 to exhaust 294 to disestablish first reverse and connects first feed line 307 to second apply line 419 to apply second brake 82 to establish second reverse drive. With a reduction in speed to a downshift speed, the hysteresis value below the upshift speed, the reverse one two shift valve will downshift to reestablish first reverse drive.

Also at the time the selector valve 191 is shifted to reverse position the reverse pressure in line 195 is connected to the spring chamber 277 to hold the lockup valve 271 in downshift position so the lockup clutch 23 cannot be engaged in reverse drives. The reverse pressure line 195 is also connected to the spring chamber 365 of the three four shift signal valve 358 so this valve is positively and quickly shifted to third position on a selector valve shift to reverse to insure prior engagement of the fourth clutch 63.

The manual signal valve 240 is normally closed blocking the connection between the main pressure signal feed line 194 and governor signal line 236 for the normal above described speed responsive governor controlled operation in forward and reverse and may be selectively opened by the operator to connect main line pressure from the signal feed line 194 to the governor line 236. The manual signal valve is for example a normally closed solenoid valve which the operator opens by closing a button switch on the end of the shift lever handle for operating the selector valve 191. When the selector valve 191 is in the forward drive four position or any other forward position opening the manual signal valve supplies main line pressure to governor signal line 236, which is operative at any speed including zero speed, to manually upshift the lockup shift valve 271 to engage the lockup clutch 23 and to upshift all shift signal valves, the one two shift signal valve 316, the two three shift signal valve 341 and the three four shift signal valve 358 and thus the respective one two, two three and three four relay valves 378, 406 and 424 to manually establish forward fourth ratio drive in the gear unit as described above in drive four. In forward positions of the selector valve 191 drive four main line pressure in chamber 290 and main line pressure in governor chamber 293 exert substantially balanced forces and the spring 289 holds the reverse one two shift valve in the downshift position as during normal forward operation.

When the selector vlave 191 is in reverse position for the normal above described first and second reverse operation, if it is desired to shift to or hold the transmission in second reverse, the manual signal valve is opened and main line pressure in governor signal line 236 and chamber 293 upshifts to the reverse one two shift valve 286 to manually engage second reverse drive as described above on a speed responsive upshift. In manual second reverse torque converter drive is maintained, since main line pressure provided by reverse line 195 to spring chamber 277 and by governor signal line 236 to governor chamber 274 exert substantially balanced forces on the lockup shift valve 271 so the spring 276 holds this valve downshifted preventing lockup. Similarly reverse pressure line 195 provides main line pressure in the spring chambers 384 and 365 respectively of the one two relay valve 378 and three four shift signal valve 358 to retain these valves downshifted for the reverse drive position of the automatic shift valves. The two three shift signal valve 341 and two three relay valve 406 are upshifted but this has no effect when the one two relay valve 378 is downshifted.

In the above description, references to a direction of the valve on the drawing as right or left is merely for convenience and it will be appreciated that the location and relative arrangement of the valves is not important but that they may perform the above described functions in any position.

It will be appreciated that the invention may be used in the above described preferred embodiment and modifications thereof.

It is claimed:

1. A transmission and control comprising: an input shaft; an output shaft; multiratio planetary gearing means including a plurality of drive means selectively engageable for establishing a plurality of forward drive ratios and a plurality of reverse drive ratios between said input and output shafts and control means including automatic speed responsive shift valve means and manual selector valve means operative in a forward position to control said automatic shift valve means to selectively engage said drive means to selectively establish said plurality of forward drive ratios in accordance with speed and in a reverse position to control said automatic shift valve means to speed responsively selectively engage said drive means to selectively establish said plurality of reverse drive ratios and manual overcontrol means selectively operable to provide a manual signal to said control means operative in forward selector valve means position to manually engage a higher forward ratio drive at any speed for push start operation and operative in reverse selector valve means position for manually establishing a higher reverse drive at any speed.

2. A transmission and control comprising: an input shaft; an output shaft, multiratio planetary gearing means including a plurality of drive means selectively engageable for establishing a plurality of forward drive ratios and a plurality of reverse drive ratios between said input and output shafts; fluid drive means operatively connected between said input shaft and said planetary gearing means for providing a fluid drive to said planetary gearing means; selectively engageable lockup clutch means in parallel drive transmitting relation with said fluid drive means for providing a mechanical drive to said planetary gearing means; and control means including automatic lockup shift valve means operative at lockup speed to engage said lockup clutch means, automatic speed responsive shift valve means, and manual selector valve means operative in a forward position to cause said lockup shift valve means to be operable and to control said automatic shift valve means to selectively engage said drive means to selectively speed responsively engage said drive means to selectively establish said plurality of forward ratio drives in accordance with speed and in a reverse position to prevent engagement of said lockup clutch means and to control said shift valve means to selectively engage said drive means to speed responsively selectively engage said drive means to selectively establish said plurality of reverse drive ratios and manual overcontrol means selectively operable to provide a manual signal to said control means operable in forward selector valve means position to manually engage said lockup clutch means and a higher forward ratio drive at any speed for push start operation and operative in a reverse selector valve means position for manually preventing engagement of said lockup clutch means and establishing a higher reverse drive at any speed.

3. A transmission and control comprising: an input shaft; an output shaft; multiratio planetary gearing means including a forward, a first, a second, a third and a fourth drive means selectively engageable for establishing a plurality of drive ratios between said input and output shafts including four forward ratios, two reverse ratios and a neutral condition; and control means including automatic speed responsive forward shift valve means, automatic speed responsive reverse shift valve means and manual selector valve means operative in a forward position to engage said forward drive means to disable said reverse shift valve means and to permit said shift valve means to selectively speed responsively engage said first through fourth engageable drive establishing means to selectively establish first through fourth ratio drives and in a reverse position on downshift of said forward shift valve means operative to engage said fourth drive establishing means and to permit said reverse shift valve means to speed responsively selectively engage said first and second drive means for first and second reverse drives.

4. A transmission and control comprising: an input shaft; an output shaft; multiratio planetary gearing means including a forward, a first, a second, a third and a fourth drive means selectively engageable for establishing a plurality of drive ratios between said input and output shafts including four forward ratios, two reverse ratios and a neutral condition; fluid drive means operatively connected between said input shaft and said planetary gearing means for providing a fluid drive to said planetary gearing means; selectively engageable lockup clutch means in parallel drive transmitting relation with said fluid drive means for providing a mechanical drive to said planetary gearing means; and control means including automatic lockup shift valve means operative at lockup speed to engage said lockup clutch means, automatic speed responsive forward shift valve means, automatic speed responsive reverse shift valve means and manual selector valve means operative in a forward position to cause said lockup shift valve means to be operable, to engage siad forward drive means, to disable said reverse shift valve means and to permit said shift valve means to selectively speed responsively engage said first through fourth engageable drive establishing means to selectively establish first through fourth ratio drives and operative in a reverse position to prevent engagement of said lockup clutch means, to hold said forward shift valve means in downshifted position to engage said fourth drive establishing means and to permit said reverse shift valve means to speed responsively selectively engage said first and second drive means for first and second reverse drives.

5. A transmission and control comprising: an input shaft; an output shaft; multiratio planetary gearing means including a forward, a first, a second, a third and a fourth drive means selectively engageable for establishing a plurality of drive ratios between said input and output shafts including four forward ratios, two reverse ratios and a neutral condition; fluid drive means operatively connected between said input shaft and said planetary gearing means for providing a fluid drive to said planetary gearing means; selectively engageable lockup clutch means in parallel drive transmitting relation with said fluid drive means for providing a mechanical drive to said planetary gearing means; control means including automatic lockup shift valve means operative at lockup speed to engage said lockup clutch means, automatic speed responsive forward shift valve means, automatic speed responsive reverse shift valve means and manual selector valve means operative in a forward position to cause said lockup shift valve means to be operable, to engage said forward drive means, to disable said reverse shift valve means and to permit said shift valve means and to cause operation of said forward shift valve means to selectively speed responsively engage said first through fourth engageable drive establishing means to selectively establish first through fourth ratio drives and operative in a reverse position to prevent engagement of said lockup clutch means, to hold said forward shift valve means in downshifted position to engage said fourth drive establishing means and to permit said reverse shift valve means to speed responsively selectively engage said first and second drive means for first and second reverse drives and manual overcontrol means selectively operable to provide manual signal to said control means operative in forward selector valve means position to engage said lockup clutch means and to engage a higher forward ratio drive for push start operation and operative in reverse selector valve means position for manually establishing reverse second drive at any speed.

6. A transmission and control comprising: an input member; an intermediate member; an output member; a fluid drive connecting said input member to said intermediate member; a fluid operated lockup clutch means connected between said input member and said intermediate member engageable to lockup said fluid drive; multiratio planetary gearing means connected between said intermediate member and said output member having a forward, a first, a second, a third and a fourth drive means selectively fluid operated for engagement for establishing drives operative on engagement of the forward drive means and selective engagement of the first, second, third and fourth drive means to respectively provide first, second, third and fourth forward drives and operative on engagement of the fourth drive means and selective engagement of the first and second drive means to respectively provide first and second reverse drive; a source of fluid under pressure; governor means having a signal passage and operatively connected to a member providing governor pressure in said signal passage proportional to speed and less than said source pressure; selector valve means connected to said source providing in forward position a forward drive pressure connected to engage said forward drive establishing means and in reverse position a reverse pressure; manual signal valve means providing a connection between said source and governor means normally closed to block said connection and open said connection providing a higher pressure manual signal in said governor passage; lockup shift valve means operatively connected to said source, said governor passage, said selector valve means and said lockup clutch means normally operative in forward drive in response to said governor pressure at lockup speed or said manual signal pressure to control fluid supply between said source and lockup clutch means to engage said lockup clutch and in reverse drive in response to reverse pressure and governor pressure or said higher manual signal pressure to prevent lockup; shift control means connected to said selector valve and drive establishing means and including forward shift valve means, and reverse shift valve means connected to said governor passage operative in response to forward pressure to hold said reverse shift valve means downshifted and said forward shift valve means connecting said source sequentially with increasing speed and governor pressure to said first, second, third and fourth drive means for sequentially establishing forward first, second, third and fourth drives and operative in response to reverse pressure to hold said forward shift valve means downshifted to connect said reverse pressure to said fourth drive means and to connect said source through said downshifted reverse shift valve means to said first drive means for first reverse drive and on upshift of said reverse shift valve means by increased governor pressure, and also responsive to manual signal pressure, to connect said source through said downshifted forward shift valve means and upshifted reverse shift valve means to said second drive means for reverse second drive.

7. A transmission and control comprising: an input member; an output member; multiratio planetary gearing means connected between said input member and said output member having a forward, a first, a second, a third and a fourth drive means selectively fluid operated for engagement for establishing drives operative on engagement of the forward drive means and selective engagement of the first, second, third and fourth drive means to respectively provide first, second, third and fourth forward drives and operative on engagement of the fourth drive means and selective engagement of the first and second drive means to respectively provide first and second reverse drive; a source of fluid under pressure; governor means having a signal passage and operatively connected to a member providing governor pressure in said signal passage proportional to speed and less than said source pressure; selector valve means connected to said source providing in forward position a forward drive pressure connected to engage said forward drive establishing means and in reverse position a reverse pressure; manual signal valve means providing a connection between said source and governor means normally closed to block said connection and open said connection providing a higher pressure manual signal in said governor passage; shift control means connected to said selector valve and drive establishing means and including forward shift valve means and reverse shift valve means connected to said governor passage operative in response to forward pressure to hold said reverse shift valve means downshifted and said forward shift valve means connecting said source sequentially with increasing speed and governor pressure to said first, second, third and fourth drive means for selectively establishing forward first, second, third and fourth drives and operative in response to reverse pressure to hold said forward shift valve means downshifted to connect said reverse pressure to said fourth drive means and to connect said source through said downshifted reverse shift valve means to said first drive means for first reverse drive and on upshift of said reverse shift valve means by increased governor pressure, and also responsive to manual signal pressure, to connect said source through said downshifted forward shift valve means and upshifted reverse shift valve means to said second drive means for reverse second drive.

8. A transmission and control comprising: an input member; an output member; multiratio planetary gearing means connected between said input member and said output member having a forward, a first, a second, a third and a fourth drive means selectively fluid operated for engagement for establishing drives operative on engagement of the forward drive means and selective engagement of the first, second, third and fourth drive means to respectively provide first, second, third and fourth forward drives and operative on engagement of the fourth drive means and selective engagement of the first and second drive means to respectively provide first and second reverse drive; a source of fluid under pressure; governor means having a signal passage and operatively connected to a member providing governor pressure in said signal passage proportional to speed and less than said source pressure; selector valve means connected to said source providing in forward position a forward drive pressure connected to engage said forward drive establishing means and in reverse position a reverse pressure; manual signal valve means providing a connection between said source and governor means normally closed to block said connection and open said connection providing a higher pressure manual signal in said governor passage; shift control means connected to said selector valve and drive establishing means and including forward first shift valve means, forward second third shift valve means and forward third shift valve means each connected to said governor passage for sequential upshift respectively in response to low, intermediate and high speed governor pressure and operative in response to said manual signal pressure to upshift all the forward shift valve means and reverse shift valve means connected to said governor passage for upshift in response to a low speed governor or manual signal pressure and operative in response to forward pressure to hold said reverse shift valve means downshifted and said first shift valve means connecting said source through said reverse shift valve means to said first drive means for forward first drive and on upshift connecting said source through the downshifted second shift valve means and reverse shift valve means to said second drive means for forward second drive, said second shift valve means on upshift connecting said source supplied through said upshifted first shift valve means through said third shift valve means to said third drive means for forward third drive and said third shift valve means on upshift connecting said source supplied through said first and second shift valve means to said fourth drive means for forward fourth drive and operative in response to reverse pressure to downshift said third shift valve means and connect said reverse pressure to said fourth drive means and to hold said first shift valve means downshifted to connect said source through said downshifted reverse shift valve means to said first drive means for first reverse drive and on upshift of said reverse shift valve means by increased governor pressure, and also responsive to manual signal pressure, to connect said source through said downshifted first shift valve means and upshifted reverse shift valve means to said second drive means for reverse second drive.

9. A transmission and control comprising: an input member; an intermediate member; an output member; a fluid drive connecting said input member to said intermediate member; fluid operated lockup clutch means connected between said input member and said intermediate member engageable to lockup said fluid drive; multiratio planetary gearing means connected between said intermediate member and said output member having a forward, a first, a second, a third and a fourth drive means selectively fluid operated for engagement for establishing drives operative on engagement of the forward drive means and selective engagement of the first, second, third and fourth drive means to respectively provide first, second, third and fourth forward drives and operative on engagement of the fourth drive means and selective engagement of the first and second drive means to respectively provide first and second reverse drive; a source of fluid under pressure; governor means having a signal passage and operatively connected to a member providing governor pressure in said signal passage proportional to speed and less than said source pressure; selector valve means connected to said source providing in forward position a forward drive pressure connected to engage said forward drive establishing means and in reverse position a reverse pressure; manual signal valve means providing a connection between said source and governor means normally closed to block said connection and open said connection providing a higher pressure manual signal in said governor passage; lockup shift valve means operatively connected to said source, said governor passage, said selector valve means and said lockup clutch means normally operative in forward drive in response to said governor pressure at lockup speed or said manual signal pressure to control fluid supply between said source and lockup clutch means to engage said lockup clutch and in reverse drive in response to reverse pressure and governor pressure or said higher manual signal pressure to prevent lockup; shift control means connected to said selector valve and drive means and including forward first shift valve means, forward second shift valve means and forward third shift valve means each connected to said governor passage for sequential upshift respectively in response to low, intermediate and high speed governor pressure and operative in response to said manual signal pressure to upshift all the forward shift valve means and reverse shift valve means connected to said governor passage for upshift in response to a low speed governor or manual signal pressure and operative in response to forward pressure to hold said reverse shift valve means downshifted and said first shift valve means connecting said source through said reverse shift valve means to said first drive means for forward first drive and on upshift connecting said source through the downshifted second shift valve means and reverse shift valve means to said second drive means for forward second drive, said second shift valve means on upshift connecting said source supplied through said upshifted first shift valve means through said third shift valve means to said third drive means for forward third drive and said third shift valve means on upshift connecting said source supplied through said first and second shift valve means to said fourth drive means for forward fourth drive and operative in response to reverse pressure to downshift said third shift valve means and connect said reverse pressure to said fourth drive means and to hold said first shift valve means downshifted to connect said source through said downshifted reverse shift valve means to said first drive means for first reverse drive and on upshift of said reverse shift valve means by increased governor pressure, and also responsive to manual signal pressure, to connect said source through said downshifted first shift valve means and upshifted reverse shift valve means to said second drive means for reverse second drive.

* * * * *